United States Patent
Cannata et al.

(10) Patent No.: US 7,916,843 B2
(45) Date of Patent: Mar. 29, 2011

(54) DIGITAL TELEPHONE DATA AND CONTROL SIGNAL TRANSMISSION SYSTEM

(75) Inventors: Frank J. Cannata, Littleton, MA (US); Paul Dryer, Newton, MA (US); Mike McCormack, Gloucester, MA (US)

(73) Assignee: Hewlett-Packard Company, Palo Alto, CA (US)

(*) Notice: Subject to any disclaimer, the term of this patent is extended or adjusted under 35 U.S.C. 154(b) by 1449 days.

(21) Appl. No.: 11/352,144

(22) Filed: Feb. 10, 2006

(65) Prior Publication Data

US 2007/0201444 A1 Aug. 30, 2007

(51) Int. Cl.
*H04M 11/00* (2006.01)
(52) U.S. Cl. .......... 379/93.01; 379/90.01; 379/93.05
(58) Field of Classification Search .......... 379/90.01, 379/93.01–93.06, 93.28; 370/352–356
See application file for complete search history.

(56) References Cited

U.S. PATENT DOCUMENTS

| | | | |
|---|---|---|---|
| 6,035,020 A * | 3/2000 | Weinstein et al. | 379/93.09 |
| 6,108,028 A * | 8/2000 | Skarbo et al. | 348/14.03 |
| 6,888,840 B1 * | 5/2005 | Ramaswamy et al. | 370/412 |
| 2003/0223409 A1 | 12/2003 | Wiebe | |
| 2004/0198409 A1* | 10/2004 | Chen | 455/550.1 |
| 2005/0059291 A1* | 3/2005 | Wood | 439/418 |
| 2005/0122958 A1 | 6/2005 | Shim et al. | |
| 2007/0002837 A1* | 1/2007 | Tan | 370/352 |

FOREIGN PATENT DOCUMENTS
WO WO 02/07355 A2 1/2002
* cited by examiner

*Primary Examiner* — Melur Ramakrishnaiah

(57) ABSTRACT

Techniques are disclosed for using Ethernet Layer 1 as a means for transporting audio, control, and status signals between telephones and an aggregator device in a telephone system. Techniques are also disclosed for using the aggregator to determine whether a telephone supports only Ethernet Layer 1, and for using the aggregator to communicate with the telephone using an appropriate protocol based on the results of the determination.

29 Claims, 3 Drawing Sheets

DIGITAL TELEPHONE DATA AND CONTROL SIGNAL TRANSMISSION SYSTEM

BACKGROUND

1. Field of the Invention

The present invention relates to telephony and, more particularly, to voice over Internet Protocol (VoIP) telephone systems.

2. Related Art

Early in the history of telephony, businesses found that their needs were not fully served by telephone exchanges owned and operated by common carriers. Furthermore, it was overly cumbersome and expensive for businesses to connect each user's telephone to a distinct external telephone line. In response to these problems, businesses have adopted a variety of private telephone systems in an attempt to decrease costs, simplify maintenance, and increase the functionality provided to their users.

For example, a "key system" is a kind of multiline telephone system typically used in small office environments. Each telephone in a key system typically has a set of buttons corresponding to a set of external telephone lines. When an external telephone line is in use by someone in the office, the corresponding button on each phone is lit. To place an external telephone call (i.e., a telephone call over the public telephone network), a user presses the corresponding button on the telephone. Key systems often allow connections to as many as about ten external telephone lines. The ability to switch a larger number of telephones onto a smaller number of telephone lines eliminates the need for each telephone to be connected to a distinct external line. Such systems may provide a limited range of additional features, such as an intraoffice intercom and the ability to place lines "on hold."

One drawback of key systems is that they require each user to manually select an external telephone line for use. In contrast, a private branch exchange (PBX) system is capable of selecting outgoing lines and performing other switching functions automatically. Users of a PBX system may place internal calls merely by dialing a (typically 3- or 4-digit) extension number. To place an outgoing call, a user simply picks up the telephone handset and dials an external telephone number, possibly prefixed by a code such as the number nine. Most large businesses now use some form of PBX system.

In addition to providing the benefits of allowing a large number of telephones to be switched automatically among a relatively small number of external telephone lines, modern PBX systems typically provide their users with additional features, such as voicemail, call forwarding, call conferencing, and speed dialing.

Some PBX systems now use the Internet Protocol (IP) to carry calls. One benefit of such "voice over IP" (VoIP or IPBX) systems is their ability to enable voice and data to be transmitted over a single network, thereby creating the opportunity to eliminate the added cost of building and maintaining separate voice and data networks within a company.

In general, a special VoIP-enabled telephone is required to connect to a VoIP network. Alternatively, however, an analog telephony adapter (ATA) may be coupled to a standard analog telephone to enable such a telephone to connect to a VoIP network. Current ATAs typically use the SIP protocol.

VoIP-enabled telephones typically require expensive hardware resources to enable them to communicate using the Internet Protocol. Such phones typically require, for example, a digital signal processor (DSP) or reduced-instruction set computer (RISC), and an Ethernet Media Access Control (MAC) device to support an Ethernet protocol stack. The need to include such components in VoIP-enabled telephones drives up the manufacturing cost of such telephones. Although costs may be reduced by using a key system or by connecting an analog telephone to an IP network using an ATA, such solutions sacrifice the features and scalability that are often desired and even necessary in modern business environments.

SUMMARY

Techniques are disclosed for using Ethernet Layer 1 as a means for transporting audio, control, and status signals between telephones and an aggregator device in a telephone system. Techniques are also disclosed for using the aggregator to determine whether a telephone supports only Ethernet Layer 1, and for using the aggregator to communicate with the telephone using an appropriate protocol based on the results of the determination.

For example, one embodiment of the present invention is directed to a device for use with a telephone. The device includes a transceiver implementing Layer 1 of IEEE standard 802.3 and adapted to communicate using a Media Independent Interface (MII), and means for transmitting first digital audio and control signals through the MII without using a Media Access Control (MAC) device.

Another embodiment of the present invention is directed to a device for use with a telephone. The device includes a transceiver implementing Layer 1 of IEEE standard 802.3 and adapted to communicate using a Media Independent Interface (MII), and means for receiving first digital audio and control signals through the MII without using a Media Access Control (MAC) device.

Yet another embodiment of the present invention is directed to a method for use with a telephone. The method includes (A) controlling a transceiver implementing Layer 1 of IEEE standard 802.3 to generate first audio and control signals; and (B) transmitting the first digital audio and control signals through a media independent interface without using a Media Access Control (MAC) device.

A further embodiment of the present invention is directed to a method for use with a telephone. The method includes (A) controlling a transceiver implementing Layer 1 of IEEE standard 802.3 to generate first audio and control signals; and (B) receiving the first digital audio and control signals through a media independent interface without using a Media Access Control (MAC) device.

Another embodiment of the present invention is directed to a system including a telephone and an aggregator. The telephone includes a transceiver implementing Layer 1 of IEEE standard 802.3 and adapted to communicate using a Media Independent Interface (MII), and means for transmitting first digital audio and control signals through the MII without the use of a Media Access Control (MAC) device. The aggregator includes means for receiving the first digital audio and control signals from the telephone; means for identifying a recipient of the first digital audio signal; and means for forwarding the first digital audio signal over a network to the identified recipient.

Yet another embodiment of the present invention is directed to a device including means for receiving a data stream from a telephone over a telephone network; means for determining, based on the received data stream, whether the telephone supports communications using Layer 2 of the IEEE 802.3 standard protocol; means for communicating with the telephone using the IEEE 802.3 standard protocol if the telephone is identified to support Layer 2 of the IEEE 802.3 standard protocol; and means for communicating with the telephone using a protocol other than the IEEE 802.3 standard protocol if the telephone is not identified to support Layer 2 of the IEEE 802.3 standard protocol.

A further embodiment of the present invention is directed to a method comprising: (A) receiving a data stream from a telephone over a telephone network; (B) determining, based on the received data stream, whether the telephone supports communications using Layer 2 of the IEEE 802.3 standard protocol; (C) communicating with the telephone using the IEEE 802.3 standard protocol if the telephone is identified to support Layer 2 of the IEEE 802.3 standard protocol; and (D) communicating with the telephone using a protocol other than the IEEE 802.3 standard protocol if the telephone is not identified to support Layer 2 of the IEEE 802.3 standard protocol.

Other features and advantages of various aspects and embodiments of the present invention will become apparent from the following description and from the claims.

DETAILED DESCRIPTION

Techniques are disclosed for using Ethernet Layer 1 as a means for transporting audio, control, and status signals between telephones and an aggregator device in a telephone system. For example, referring to FIG. 1, a telephone system 100 is shown according to one embodiment of the present invention.

Figure 1:
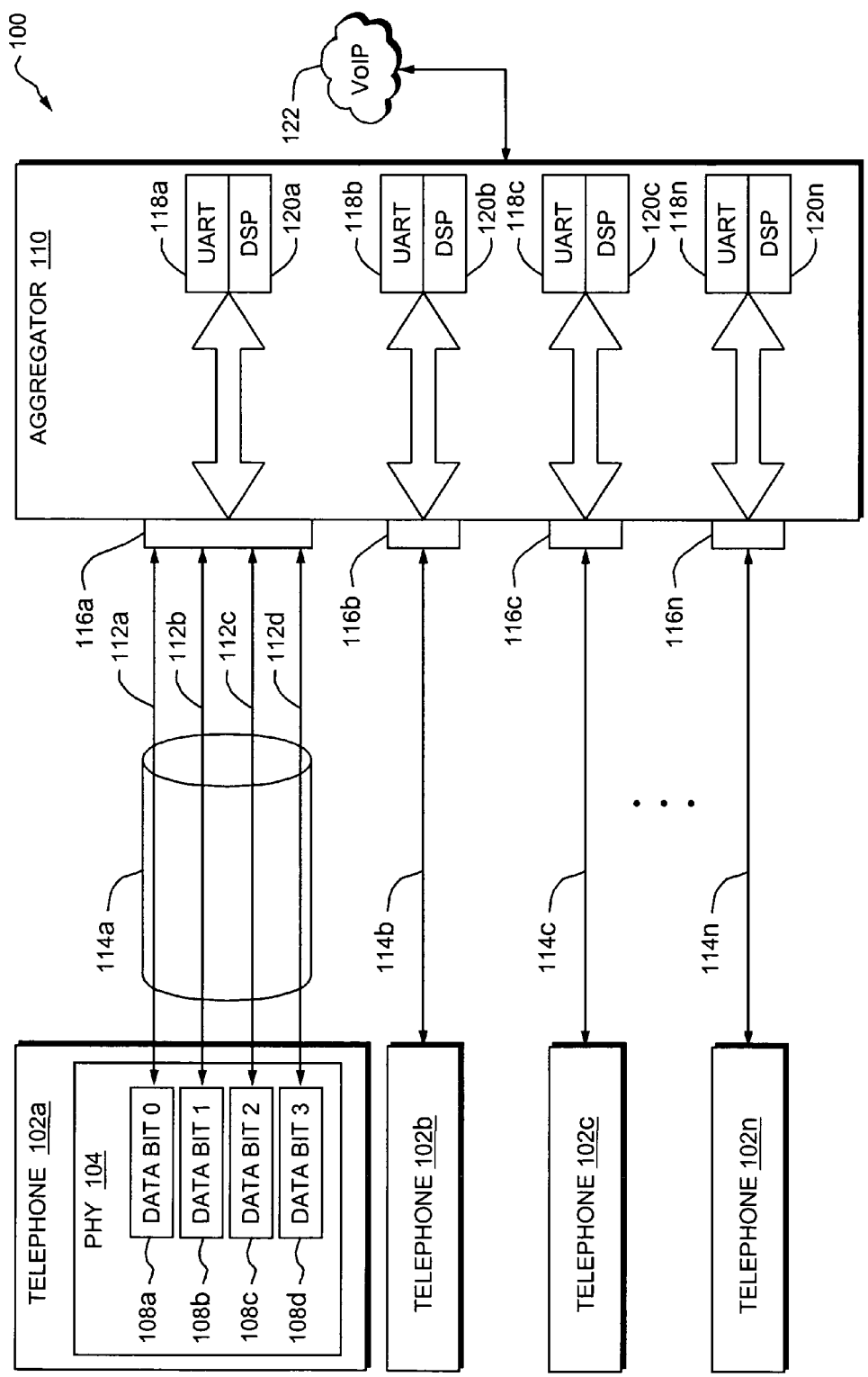
FIG. 1 is a block diagram of a telephone system according to one embodiment of the present invention.

The system 100 includes a plurality of telephones 102a-n, where n is the number of telephones. Although four telephones are shown in FIG. 1 for purposes of example, the telephone system 100 may include any number of telephones, including a single telephone. The internal structure of telephone 102a is shown. Although the remaining telephones 102b-n may have the same or similar internal structure as telephone 102a, only the internal structure of telephone 102a is shown in FIG. 1 for ease of illustration.

The telephone 102a includes an Ethernet Layer 1 transceiver 104, also referred to as a PHY (an abbreviation for the physical layer of the Open Systems Interconnection (OSI) Reference Model). PHYs are commonly found on Ethernet devices. More generally, the term PHY refers to a special electronic integrated circuit or other circuit component that provides physical access to a digital communication link.

The PHY 104 uses a Media Independent Interface (MII) to communicate over a VoIP network 122. In conventional VoIP telephones and other Ethernet-enabled devices, an MII typically is used as an interface between the PHY and an Ethernet MAC device, thereby enabling the telephone to communicate with other devices according to the Ethernet protocol. The Ethernet protocol has, to a large extent, been standardized in IEEE standard 802.3.

The MII uses four bi-directional data bits 108a-d for communication. The data bits 108a-d may also be viewed as four independent 25 Mbs channels (when used with 100 Mbs Ethernet) in the upstream (TX[3:0]) and downstream (RX[3:0]) direction.

Recall that in conventional systems, a MAC device on the telephone communicates over the MII. The telephone 102a in the system 100 of FIG. 1, in contrast, does not include a MAC device. Instead, the telephone 102a uses the four bi-directional data bits 108a-d of the MII as a "virtual data bus" between the phone 102a and an aggregator device 110.

In the example illustrated in FIG. 1, the data bits 108a-d are connected to the aggregator 110, by corresponding lines 112a-d in a cable 114a, to a port 116a on the aggregator 110. Telephones 102b-n contain similar PHYs and similarly connect to ports 116-d of the aggregator 110 over cables 114b-n, respectively. The cables 114a-n may, for example, be standard cables, such as CAT-5 cables in the case of 100 Mbps communication or (lower-cost) CAT-3 cables in the case of 10 Mbps communication. Note, however, that the telephones 102a-n may be connected to the aggregator 110 in other ways, such as via wireless connections.

The telephone 102a may transmit and receive both audio data and status and control information using data bits 108a-d. Because the telephones 102a-n include PHY devices, which communicate using Ethernet Layer 1, and do not include MAC devices or other devices for communicating using higher layers of the Ethernet protocol, the telephones 102a-n effectively communicate with the aggregator 110 using only Layer 1 of IEEE standard 802.3 standard. As will be described in more detail below, the aggregator 110 relays audio data between the telephones 102a-n and other devices connected to the VoIP network 122. The system 100, therefore, enables the telephones 102a-n to effectively communicate using the Ethernet protocol even though the telephones 102a-n themselves do not implement the complete Ethernet protocol.

More specifically, according to the scheme illustrated in FIG. 1, the telephones 102a-n need not implement Ethernet protocol stacks. As is well-known to those having ordinary skill in the art, a protocol stack is a particular software implementation of a computer networking protocol suite. Conventional VoIP telephones implement an Ethernet protocol stack, which requires relatively expensive hardware resources (such as DSPs/RISCs) to be implemented in the telephones themselves. Elimination of the need for such expensive hardware resources in the telephones 102a-n may significantly reduce the complexity and cost of manufacturing the telephones 102a-n.

In the embodiment illustrated in FIG. 1, the expensive hardware resources (e.g., DSPs/RISCs) that normally reside in the telephones 102a-n in conventional systems have been implemented instead in the aggregator 110. This may reduce the overall cost of the system 100 beyond the cost savings achieved by the individual telephones, because, for example, multiple DSPs may be aggregated into a smaller number (e.g., one) of DSPS in the aggregator 110.

This aggregation of high-value resources in the aggregator 110 allows the individual telephones 102a-n to be relatively inexpensive and "dumb," without loss of the high-end features normally provided in a PBX system, because the same features may be provided to the telephones 102a-n by the aggregated resources in the aggregator 110. As a result, the telephones 102a-n may provide features comparable to high-end PBX telephones, but at a lower cost. Further cost reductions may be achieved, for example, by designing the system 100 to use 10 Mbps communication, thereby enabling enterprise users of the system 100 to use commonly-existing CAT-3 wiring and thereby avoid the need to perform expensive rewiring to achieve compatibility with the telephone system 100.

Figure 2:
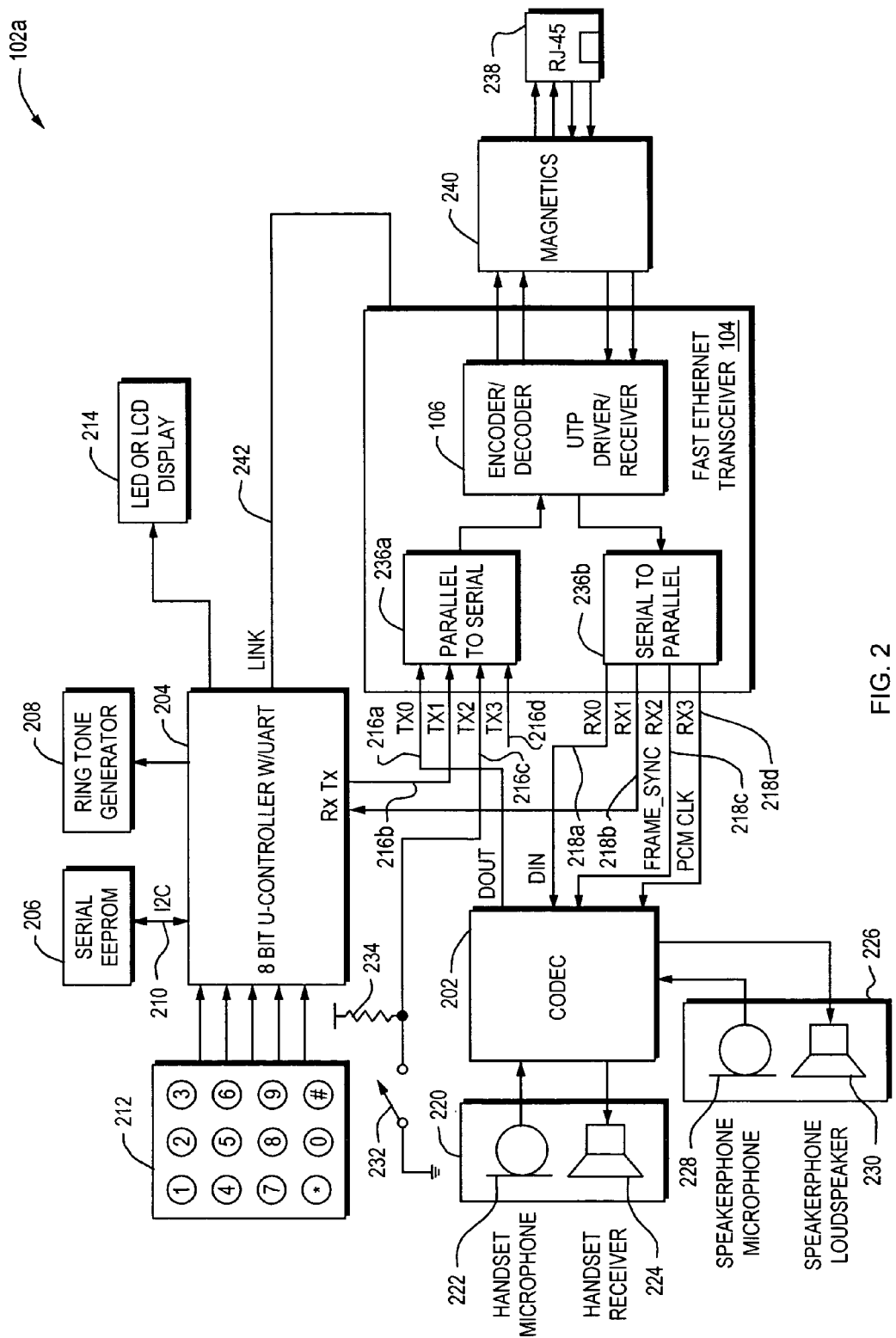
FIG. 2 is a block diagram is a telephone according to one embodiment of the present invention.
Figure 3:
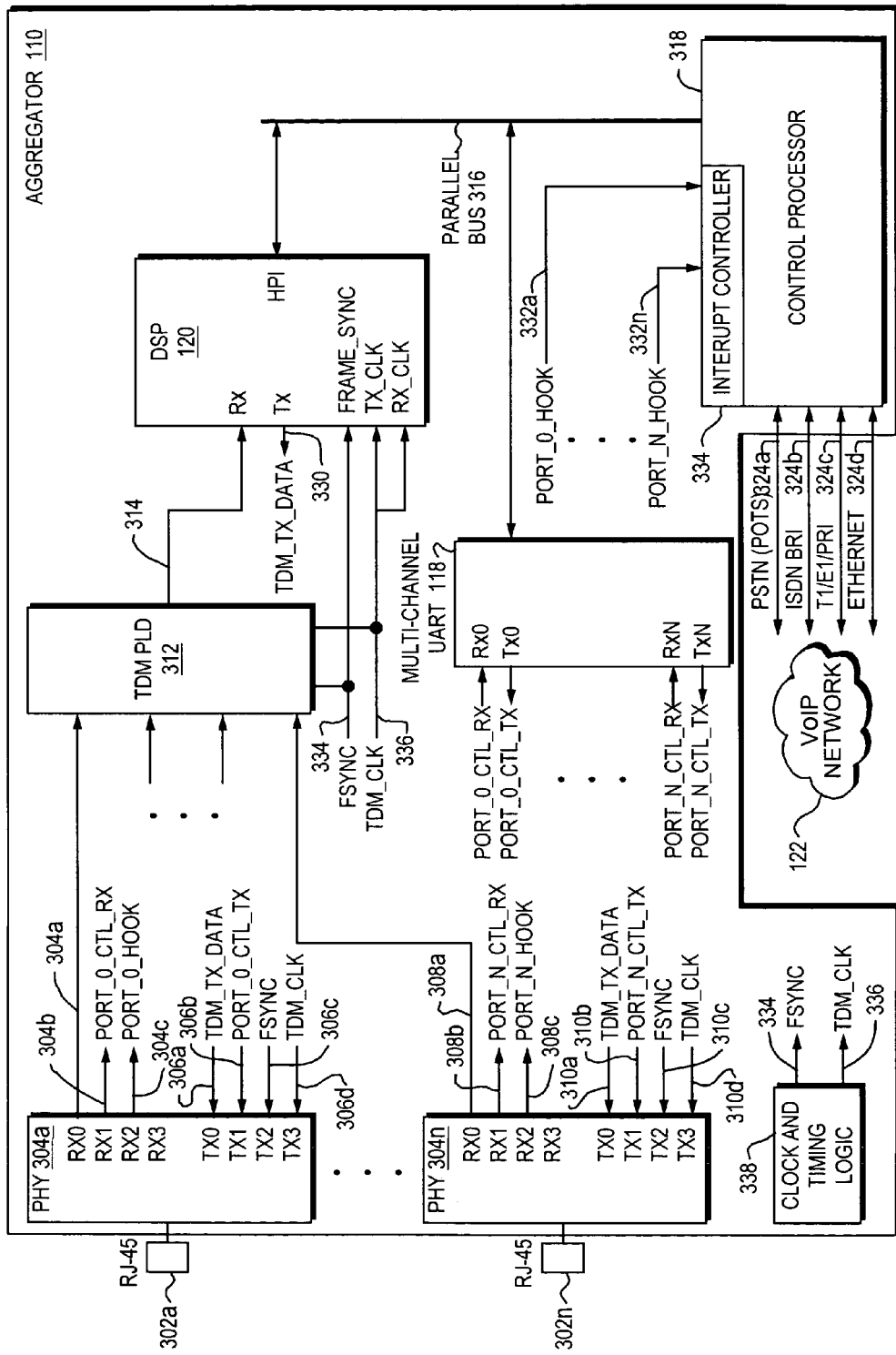
FIG. 3 is a block diagram of an aggregator according to one embodiment of the present invention.

Having generally described various embodiments of the present invention, a particular embodiment of the present invention will now be described in more detail. Referring to FIG. 2, a block diagram is shown of one embodiment of the telephone 102a. Referring to FIG. 3, a block diagram is shown of one embodiment of the aggregator 110.

In the embodiment illustrated in FIG. 2, the telephone 102a is implemented primarily using the MII of the PHY device 104 (represented by lines 216a-d and 218a-d), a codec 202, and a microcontroller 204. The functions performed by each of these components, and other components of the telephone 102a, will now be described. Note that in the embodiment illustrated in FIG. 2, the telephone 102a does not include a MAC device.

A serial EEPROM 206 stores information identifying the telephone 102a, such as its model and extension number. Microcontroller 204 reads from and writes to EEPROM 206 over an I$^2$C bus 210. A ring tone generator 208 generates a ring tone under control of the microcontroller 204. Keypresses on a keypad 212 are also signaled to the microcontroller 204. The microcontroller 204 displays status and other information (such as caller ID, time, and date information) on a display 214.

The individual MII data bits 108a-d shown in FIG. 1 may be used in any of a variety of ways. For example, in the embodiment illustrated in FIG. 2, bits TX0 216a and RX0 218a connect to codec device 202 in the telephone 102a for transport of audio signals to and from a handset 220 (which includes microphone 222 and receiver 224) and/or a speakerphone 226 (which includes microphone 228 and receiver 230).

Bit TX1 216b is used by the microcontroller 204 to send status messages from the telephone 102a to the aggregator 110. Examples of such status messages include on/off hook (as indicated by hook switch 232 connected to a pullup resistor 234 in parallel through resister 234), key strokes from the telephone keypad 212, and phone ID information from the EEPROM 206.

In the opposite direction, the microcontroller 204 in the telephone 102a may receive control messages from the aggregator 110 on bit RX1 218b. Such control messages may, for example, include messages instructing the telephone 102a to control the display 214 and ring the telephone 102a (by signaling the ring tone generator 208).

In the embodiment illustrated in FIG. 1, the aggregator 110 includes a plurality of UARTs 118a-n, one for each of the telephones 102a-n. The UARTs 118a-n handle control and status information coming from the phones 102a-n to the aggregator 110. The aggregator 110 also contains DSPs 120a-n. Although in the example illustrated in FIG. 1 there is one DSP per UART, this is not a requirement of the present invention. There may, for example, be a different number of DSPs than UARTs in the aggregator 110. In the embodiment of the aggregator 110 illustrated in FIG. 3, the plurality of UARTs 118a-n are implemented as a single multi-channel UART 118, and the plurality of DSPs 120a-n are implemented as a single DSP 120. As will be described in more detail below, the multi-channel UART 118 is controlled by the control processor 318.

Telephone 102a may be connected to a jack using, for example, an RJ-45 connector 238 and associated magnetics 240. A cable may then connect the RJ-45 connector 238 at the telephone 102a to a corresponding RJ-45 connector 302a at the aggregator 110 (FIG. 3). The remaining telephones 102b-n may be similarly connected to the aggregator 110. RJ-45 connectors 302a-n at the aggregator 110 are connected to corresponding PHYs 304a-n in the aggregator 110.

The transceiver 104 in the telephone 102a (FIG. 2) outputs a "link" signal on line 242 indicating whether the transceiver 104 has successfully established a link with the transceiver 304a on the aggregator 110. The microcontroller 204 uses this link signal to determine whether it can transmit/receive control information on lines TX1 216b and RX1 218b, respectively.

Signals TX0 216a, TX1 216b, and TX2 216c transmitted by the telephone 102a are represented in the aggregator 110 as signals RX0 304a, RX1 304b (PORT_0_CTL_RX), and RX2 304c (PORT_0_HOOK), respectively. The same signals (not shown) transmitted by telephone 102n are represented at the aggregator 110 as signals RX0 308a, RX1 308b (PORT_N_CTL_RX), and RX2 308b (PORT_N_HOOK). The same signals from the remaining telephones 102b-(n−1) are handled in the same way at the aggregator 110.

Similarly, signals RX0 218a, RX1 218b, RX2 218c, and RX3 218d received at the telephone 102a correspond to signals TX0 306a (TDM_TX_DATA), TX1 306b (PORT_0_CTL_TX), TX2 306c (FSYNC), and 306d (TDM_CLK) transmitted by the aggregator 110. Signals TX0 310a (TDM_TX_DATA), TX1 310b (PORT_N_CTL_TX), TX2 310c (FSYNC), and TX3 310d (TDM_CLK) are similarly received at telephone 102n. Similar signals are transmitted by the aggregator 110 to the remaining telephones 102b-(n−1).

As will now be described, audio signals received from the telephones 102a-n are time-division multiplexed into a serial stream. Clock and timing logic 338 in the aggregator 110 generates a frame sync (FSYNC) signal 334 and a time-division multiplexing clock (TDM_CLK) signal 336. A single frame sync interval may, for example, be divided into 24 time slots, each of which may be assigned to a distinct one of the telephones 102a-n. The FSYNC 334 and TDM_CLK signals are used, for example, by the codec 202 in the telephone 102a to transmit audio data during the time slice allocated to the telephone 102a.

Aggregator 110 uses TX2 306c (FSYNC) to provide the telephone 102a with an 8 KHz frame sync pulse (RX2 218c). This signal is used by the codec 202 to identify the beginning of each frame. The aggregator 110 uses bit TX3 306d (TDM_CLK) as a time-division multiplexing bus clock (RX3 218d) for the codec 202. The codec 202 uses this signal to clock in/out time-division multiplexed voice samples from/to the DSP 120 in the aggregator 110.

The audio signals received at the aggregator 110 from the telephones 102a-n (e.g., on lines 304a and 308a) are provided to a time-division multiplexing programmable logic device (TDM PLD) 312. The TDM PLD performs time-division multiplexing on the audio signals to produce a combined signal on line 314, which is provided to DSP 120. The DSP 120 performs signal processing tasks, such as echo cancellation, on the multiplexed signals. The DSP 120 provides the resulting processed audio signal on parallel bus 316, where it is received by control processor 318.

The control processor 318 acts as an interface between the telephones 102a-n and VoIP network 122. The control processor 318, for example, reads audio signals from the DSP 120, packetizes them, and transmits them over the VoIP network 122. The control processor 318 implements a TCP/IP stack and RTP, RTCP, and SIP protocols. The control processor 318 also provides other functionality, such as interfacing to PSTN (POTS), T1, ISDN, and Ethernet networks (over buses 324a-d, respectively), and terminating the phone control path.

In the opposite direction, audio data received over the VoIP network 122 at the control processor 318 of the aggregator 110 is transmitted over parallel bus 316 to the DSP 120, which performs appropriate signal processing on the signal, and transmits the time-division multiplexed signal on line 330 and to the appropriate phone. The codec on each phone (e.g., the codec 202 on phone 102a) is configured to send and receive audio data only on the specific timeslot allotted to that phone. Therefore, when the phone 102a receives a time-division multiplexed audio signal from the aggregator 110, the codec 202 only decompresses its allocated audio data and therefore implicitly demultiplexes the time-division multiplexed signal.

When the on-hook status of telephone 102a changes, a signal is generated in the telephone 102a on line TX2 216c, transmitted to the aggregator 110 in the manner described above, and transmitted to an interrupt controller 334 in the control processor 318 on a corresponding one of the lines 332a-332n. Interrupt controller 334 triggers and processes an interrupt in the control processor 318 to handle the change in off-hook status.

In the description above of the telephone 102a in FIG. 2, it was stated that the telephone 102a may receive control messages from the aggregator 110. Referring to FIG. 3, control processor 318 writes a control message to UART 118, which forwards the control message to the appropriate ones of the telephones 102a-n on appropriate lines (e.g., 306b or 310b).

In summary, the aggregator 110 acts as an interface between the telephones 102a-n and other devices connected to VoIP network 122. The aggregator 110, for example, receives audio data from the telephones 102a-n and transmits that data over the VoIP network 122. Similarly, the aggregator 110 receives audio data over the VoIP network 122 and transmits that data to the appropriate ones of the telephones 102a. The aggregator 110, therefore, performs at least some of the functions of a switch.

In addition to the cost savings described above, an advantage of the system 100 is that the data bits 108a-d of the MII act as individual low-latency channels for audio, and as low-latency out-of-band control and status channels for the attached phone 102a. Although low latency is not critical in many Ethernet-enabled devices, it is particularly important in VoIP telephones. Even a relatively small increase in latency can result in audible echo or other artifacts that degrade the quality of the audio signal and detract from the usability of the system.

Because conventional VoIP telephones communicate directly over an Ethernet network that may carry not only voice traffic from many phones but also data, low latency cannot be guaranteed by such phones. As a result, conventional VoIP phones typically need to buffer several hundred bytes of voice data before transmitting audio over the network.

In contrast, because the lines 112a-d between the data bits 108a-d and the aggregator 116a in the system 100 of FIG. 1 are direct serial connections rather than switched data streams, it is possible to maintain consistent low latency communications between the telephone 102a and the aggregator 110. The system 100, in other words, utilizes the Layer 1 sub-layer of Ethernet as an extremely low latency point-to-point link between the telephones 102a-n and the aggregator 110 for both audio and control/status signals. The aggregator 110 may then use the DSP 120a or other means commonly employed by VoIP telephones to address any potentially adverse effects of latency over the VoIP network 122.

It may be useful for a network to have the ability to include not only phones of the type illustrated in FIGS. 1 and 2 (i.e., phones capable of communicating over a VoIP network without implementing the complete IEEE standard 802.3 protocol), but also conventional VoIP-enabled phones (i.e., phones that implement a full IEEE standard 802.3 protocol stack). In particular, it may be useful for the aggregator 110 to be capable of communicating with both types of telephones. One advantage of providing the aggregator 110 with this ability is that it would ease adoption of the type of telephone illustrated in FIGS. 1 and 2 and would provide the owners/operators of the telephone system 100 with additional flexibility.

Although the following discussion will refer to the telephone 102a, the same techniques may be applied to any of the telephones 102a-n. The transceiver 104 in the telephone 102a may be strapped to operate in full-duplex 100 Mbps mode when the telephone is turned on. Conventional Ethernet transceivers, such as the transceiver 104, typically support auto-negotiation, according to which the transceiver 104 attempts to communicate with the device to which it is connected for the purpose of negotiating a connection speed that is supported by both devices. Techniques for performing auto-negotiation are well-known to those having ordinary skill in the art.

In one embodiment of the present invention, the transceiver 104 in the telephone 102a is configured to transmit a predetermined sequence of data on line TX1 216b upon power-up and after the microcontroller 204 determines that the link between telephone 102a and aggregator 110 is up, by reference to the link signal on line 242. Correspondingly, the aggregator 110 may be configured to poll each status line (e.g., RX1 304b and RX1 308b) for the predetermined sequence of data after the control processor 318 determines that the link between telephone 102a and aggregator 110 is up. Note that there may be a "link" line (similar to line 242 in FIG. 2) between transceiver 304a and control processor 318 that carries a signal indicating whether the link between phone 102a and aggregator 110 is up.

If the aggregator 110 begins to receive data on a particular status line and does not detect the predetermined sequence of data on that line within a predetermined period of time, the aggregator 110 concludes that the transmitting device is not a telephone of the type illustrated in FIGS. 1 and 2. As a result, the aggregator 110 communicates with the transmitting device using IEEE standard 802.3 protocol.

If, however, the aggregator 110 does detect the predetermined sequence of data on the status in line with the predetermined period of time, the aggregator 110 concludes that the transmitting device is a telephone of the type illustrated in FIGS. 1 and 2. As a result, the aggregator 110 communicates with the transmitting device over the TX1 and RX1 bits of the MII using a protocol other than the IEEE standard 802.3 protocol. Such a protocol may be any protocol suitable for communicating with telephones of the type illustrated in FIGS. 1 and 2. In summary, the telephones 102a-n may be preconfigured to use a particular data sequence (i.e., code) to identify themselves to the aggregator 110 as telephones that do not support the IEEE standard 802.3 protocol.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions. For example, the particular number of components (e.g., UARTs 118a-n and DSPs 120a-n) shown in FIG. 1 is merely an example and does not constitute a limitation of the present invention. Such components need not have a one-to-one correspondence with the telephones 102a-n. Furthermore, components other than UARTs 118a-n and DSPs 120a-n may be used to perform equivalent functions. The system 100 may include more than one aggregator and may be connected to more than one network.

Although telephones 102a-n are shown in FIG. 1 for purposes of example, the same or similar techniques may be applied to other kinds of communication devices, such as fax machines, modems, multifunction printers, photocopiers, or any other kind of device that can be connected to a PBX.

The connections 114a-n between the telephones 102a-n and the aggregator 110 may be of any suitable length. For example, in the case of 10/100 Ethernet, the connections 114a-n may be implemented using cables of up to 100 meters. As a result, the telephones 102a-n need not be co-located with the aggregator 110. The telephones 102a-n may, for example, be conveniently located at users' desks, while the aggregator is located in a utility closet or elsewhere where telecommunication equipment is maintained.

The term "PBX" is used broadly herein to refer, for example, to analog PBX, IPBX, or hosted PBX systems that deliver PBX functionality as a service, available over the Public Service Telephone Network (PSTN) and/or the Internet. Hosted PBXs are typically provided by the telephone company, using equipment located in the premises of the telephone company's exchange. Various interfaces exist for connecting PBXs to each other, such as a variety of proprietary protocols, QSIG, DPNSS, and IP (e.g., H0.323, SIP, and IAX). These and other interfaces are within the scope of the present invention. Similarly, various interfaces exist for connected PBXs to trunk lines, such as standard POTS (Plain Old Telephone System) lines, ISDN, and IP (e.g., H0.323, SIP, MGCP, and IAX). These and other interfaces are within the scope of the present invention.

Furthermore, the various physical interconnects used in the system 100 (such as the connections 114a-n between the telephones 102a-n and the aggregator 110) may be of any type. For example, such connections may be wired or wireless in any combination. Furthermore, the particular number and configuration of data bits 108a-d illustrated and described above with respect to FIG. 1 is merely an example and does not constitute a limitation of the present invention.

Although the terms "control" and "status" may be used separately herein to refer to different kinds of signals, the term "control" may also be used herein for purposes of simplicity to refer generally both to "control" and "status" signals in contrast to "data" signals.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A device for use with a telephone, the device comprising:
a transceiver to implement Layer 1 of IEEE standard 802.3 and to communicate using a Media Independent Interface (MII), wherein the transceiver is to transmit first digital audio and control signals through the MII using an incomplete Ethernet protocol stack.

2. The device of claim 1,
wherein the transceiver is to receive second digital audio and control signals through the MII from the aggregator.

3. The device of claim 1, wherein the transceiver is to transmit the first digital audio and control signals through a CAT-5 cable.

4. The device of claim 1, wherein the transceiver is to transmit the first digital audio and control signals through a CAT-3 cable.

5. The device of claim 1, wherein the transceiver is to transmit the first digital audio and control signals for an aggregator to complete the Ethernet protocol stack for the transceiver.

6. The device of claim 1, wherein the transceiver is to transmit the first digital audio and control signals using data bits of the MII.

7. The device of claim 1, wherein the first control signal comprises a status signal.

8. A device for use with a telephone, the device comprising:
a transceiver to implement Layer 1 of IEEE standard 802.3 and to communicate using a Media Independent Interface (MII), wherein the transceiver is to receive first digital audio and control signals through the MII using an incomplete Ethernet protocol stack.

9. The device of claim 8,
wherein the transceiver is to transmit second digital audio and control signals through the MII from the aggregator.

10. The device of claim 8, wherein the transceiver is to receive the first digital audio and control signals through a CAT-5 cable.

11. The device of claim 8, wherein the transceiver is to receive the first digital audio and control signals through a CAT-3 cable.

12. The device of claim 8, wherein the first digital audio and control signals comprise signals communicated by an aggregator using an incomplete Ethernet protocol stack and wherein the transceiver is to complete the incomplete Ethernet protocol stack used to communicate the signals by the aggregator.

13. The device of claim 8, wherein the transceiver is to receive the first digital audio and control signals using data bits of the MII.

14. The device of claim 8, wherein the first control signal comprises a status signal.

15. A method for use with a telephone, the method comprising:
 (A) controlling a transceiver implementing Layer 1 of IEEE standard 802.3 to generate first audio and control signals; and
 (B) transmitting the first digital audio and control signals through a media independent interface (MII) using an incomplete Ethernet protocol stack.

16. The method of claim 15, further comprising:
 (C) receiving second digital audio and control signals through the media independent interface.

17. The method of claim 15, wherein the (C) comprises transmitting the first digital audio and control signals using data bits of the MII.

18. The method of claim 15, wherein the first control signal comprises a status signal.

19. The method of claim 15, wherein the (B) comprises transmitting the first digital audio and control signals for an aggregator to complete the Ethernet protocol stack for the transceiver.

20. A method for use with a telephone, the method comprising:
 (A) controlling a transceiver implementing Layer 1 of IEEE standard 802.3 to generate first audio and control signals; and
 (B) receiving the first digital audio and control signals through a media independent interface using an incomplete Ethernet protocol stack.

21. The method of claim 20, wherein the first control signal comprises a status signal.

22. The method of claim 20, wherein the first digital audio and control signals comprise signals communicated by an aggregator using an incomplete Ethernet protocol stack, and wherein the (B) comprises completing the incomplete Ethernet protocol stack in the transceiver.

23. A system comprising:
 a telephone comprising:
  a transceiver to implement Layer 1 of IEEE standard 802.3 and to communicate using a Media Independent Interface (MII); and
 an aggregator to receive the first digital audio and control signals from the telephone, to identify a recipient of the first digital audio signal, and to forward the first digital audio signal over a network to the identified recipient, wherein the transceiver is to communicate the first digital audio and control signals to the aggregator using an incomplete Ethernet protocol stack and wherein the aggregator is to complete the Ethernet protocol stack for the transceiver.

24. The system of claim 23, wherein the aggregator is to transmit second digital audio and control signals to the telephone, and wherein the telephone is to receive the second digital audio and control signals through the MII.

25. The system of claim 23, wherein the aggregator is to process the first digital audio signal.

26. The system of claim 25, wherein the aggregator further comprises a digital signal processor.

27. The system of claim 25, wherein the aggregator comprises a reduced instruction set computer.

28. The system of claim 23, wherein the aggregator is to forward the first digital audio signal in accordance with IEEE standard 802.3.

29. The system of claim 23, wherein the aggregator is to
 identify whether the telephone supports communications using Layer 2 of the IEEE 802.3 standard protocol, to communicate
 with the telephone using the IEEE 802.3 standard protocol if the telephone is identified to support Layer 2 of the IEEE 802.3 standard protocol, and to communicate
 with the telephone using a protocol other than the IEEE 802.3 standard protocol if the telephone is not identified to support Layer 2 of the IEEE 802.3 standard protocol.

* * * * *